US010062221B2

(12) United States Patent
Yu

(10) Patent No.: US 10,062,221 B2
(45) Date of Patent: Aug. 28, 2018

(54) SYSTEM PRODUCING ALARM WHEN WHEEL MISALIGNMENT OF VEHICLE OCCURS AND CONTROL METHOD FOR PRODUCING THE SAME

(71) Applicant: Hyundai Motor Company, Seoul (KR)

(72) Inventor: Tae Young Yu, Seoul (KR)

(73) Assignee: Hyundai Motor Company, Seoul (KR)

( * ) Notice: Subject to any disclaimer, the term of this patent is extended or adjusted under 35 U.S.C. 154(b) by 49 days.

(21) Appl. No.: 15/298,585

(22) Filed: Oct. 20, 2016

(65) Prior Publication Data

US 2017/0301156 A1    Oct. 19, 2017

(30) Foreign Application Priority Data

Apr. 15, 2016 (KR) .................. 10-2016-0046147

(51) Int. Cl.
*G07C 5/08* (2006.01)
*B62D 15/02* (2006.01)
*G01C 21/20* (2006.01)

(52) U.S. Cl.
CPC ........ *G07C 5/0816* (2013.01); *B62D 15/0245* (2013.01); *G01C 21/20* (2013.01); *G07C 5/0808* (2013.01)

(58) Field of Classification Search
CPC ........... G07C 5/08; B62D 15/02; G01C 21/20
See application file for complete search history.

(56) References Cited

U.S. PATENT DOCUMENTS

2014/0022070 A1*  1/2014  Golomb ............... B60Q 1/0082
340/475

FOREIGN PATENT DOCUMENTS

| JP | H10132550 A | 5/1998 |
| JP | 2001-260619 A | 9/2001 |
| JP | 2002-274403 A | 9/2002 |
| JP | 2005-343260 A | 12/2005 |
| JP | 2009-255918 A | 11/2009 |
| KR | 1999-0058361 A | 7/1999 |
| KR | 10-0774669 B1 | 11/2007 |
| KR | 10-0878096 B1 | 1/2009 |

* cited by examiner

*Primary Examiner* — Yuen H Wong
(74) *Attorney, Agent, or Firm* — Mintz Levin Cohn Ferris Glovsky and Popeo, P.C.; Peter F. Corless

(57) ABSTRACT

A system is configured to produce an alarm when wheel misalignment of a vehicle occurs. The system includes: a navigation device; a lane change detector configured to detect lane change frequency information of the vehicle; a driving information detector configured to detect vehicle speed information and brake frequency information; a steering wheel rotation angle detector configured to detect a rotation angle of a steering wheel; and a controller deriving a criterion based on the rotation angle, for determining whether or not the vehicle travels straight by receiving from the navigation device, the lane change detector, the driving information detector, and the steering wheel rotation angle detector, information necessary to determine whether or not the vehicle travels straight, the controller transmitting an alarm signal to a driver when a current rotation angle of the steering wheel detected by the steering wheel rotation angle detector fails to satisfy the criterion.

15 Claims, 2 Drawing Sheets

SYSTEM PRODUCING ALARM WHEN WHEEL MISALIGNMENT OF VEHICLE OCCURS AND CONTROL METHOD FOR PRODUCING THE SAME

CROSS REFERENCE TO RELATED APPLICATION

The present application claims under 35 U.S.C. § 119(a) the benefit of Korean Patent Application No. 10-2016-0046147, filed Apr. 15, 2016, the entire contents of which are incorporated by reference herein.

BACKGROUND

(a) Technical Field

The present invention relates to a system configured to produce an alarm when wheel misalignment of a vehicle occurs and a control method for producing the same, the system transmitting an alarm signal to a driver of the vehicle when wheel misalignment is detected during straight driving of the vehicle, by using a navigation device, a lane change detector, a driving information detector, and a steering wheel rotation angle detector, etc. mounted in the vehicle.

(b) Description of the Related Art

Generally, a vehicle includes components such as a suspension system and a steering system, where the components are accurately assembled according to a design standard of the vehicle. A state in which the assembled components satisfy the design standard corresponds to an initial state of alignment of the wheels.

A wheel alignment adjustment device of the vehicle maintains equilibrium of frictional force, acceleration, centrifugal force, and driving force depending on movements of the vehicle. Therefore, the wheel alignment adjustment device can enhance the driving experience, and expands a contact area of tires with a road. Accordingly, the wheel alignment adjustment device can enhance steering performance, and maintains a stable position of the vehicle during straight driving or cornering of the vehicle, thereby preventing the vehicle from rolling or overturning.

It is desirable that the wheel alignment adjustment device always maintains preset angles of the components, where the preset angles are decided by the design standard. However, when a stabilizer link of the vehicle receives an external force generated by unexpected situations such as accidents and impacts from the road, etc. during driving of the vehicle, the alignment of the wheels easily changes from the preset angles.

When the vehicle having wheel misalignment is continuously driven, uneven wear of tires and degradation of steering performance occur, where the degradation of steering performance causes difficulty in driving straight and in restoring a steering wheel to a center position, etc. However, most drivers are unable to determine the alignment state of the wheels and to recognize whether or not the alignment of the wheels has changed from preset angles. Even if a driver has knowledge of vehicle maintenance, it is difficult to recognize whether or not the alignment of the wheels has changed from the preset angles.

Accordingly, due to the uneven wear of tires and the degradation of steering performance, the vehicle leans to one side or the tires are removed from the vehicle during straight driving of the vehicle, thereby causing accidents. Various technologies for enabling a driver to recognize such wheel misalignment of the vehicle have been developed. Korean Patent Application Publication No. 10-1999-0058361 discloses an apparatus and a method for detecting a wheel alignment abnormality of a vehicle by using a vehicle control part. The apparatus is capable of displaying a state of wheel misalignment when rotation moment and lateral acceleration exceed allowable limits of error during straight driving of the vehicle, so as to allow a driver of the vehicle to recognize the wheel misalignment.

The foregoing is intended merely to aid in the understanding of the background of the present invention, and is not intended to mean that the present invention falls within the purview of the related art that is already known to those skilled in the art.

SUMMARY

The present invention is directed to a system configured to produce an alarm when wheel misalignment of a vehicle occurs and a control method for producing the same, the system being capable of informing a driver of whether or not wheel misalignment occurs to prevent accidents caused when the vehicle leans to one side, etc. due to wheel misalignment during straight traveling of the vehicle.

In order to achieve the above object, according to one aspect of the present invention, there is provided a system configured to produce an alarm when wheel misalignment of a vehicle occurs, the system including: a navigation device; a lane change detector configured to detect lane change frequency information of the vehicle; a driving information detector configured to detect vehicle speed information and brake frequency information; a steering wheel rotation angle detector configured to detect a rotation angle of a steering wheel; and a controller deriving a criterion based on the rotation angle of the steering wheel, for determining whether or not the vehicle travels straight by receiving from the navigation device, the lane change detector, the driving information detector, and the steering wheel rotation angle detector, information necessary to determine whether or not the vehicle travels straight, the controller transmitting an alarm signal to a driver of the vehicle when a current rotation angle of the steering wheel detected by the steering wheel rotation angle detector fails to satisfy the criterion for determining whether or not the vehicle travels straight.

The navigation device may store curvature information of a roadway.

The information necessary to determine whether or not the vehicle travels straight may include the curvature information of the roadway, the lane change frequency information, the vehicle speed information, the brake frequency information, and the rotation angle of the steering wheel.

The criterion for determining whether or not the vehicle travels straight may be derived by detecting the rotation angle of the steering wheel occurring when a curvature of the roadway is equal to or less than a preset reference curvature, a lane change frequency is equal to or less than a preset reference lane change frequency, a vehicle speed is equal to or greater than a preset reference speed, and a brake frequency is equal to or less than a preset reference brake frequency during a preset reference time or longer.

The current rotation angle of the steering wheel may satisfy the criterion for determining whether or not the vehicle travels straight when the current rotation angle is equal to or greater than a minimum rotation angle of the steering wheel detected during the preset reference time, and is equal to or less than a maximum rotation angle of the steering wheel detected during the preset reference time.

The controller may determine that the current rotation angle of the steering wheel fails to satisfy the criterion for determining whether or not the vehicle travels straight when a difference between the current rotation angle and the minimum rotation angle exceeds a first offset reference.

The controller may determine that the current rotation angle of the steering wheel fails to satisfy the criterion for determining whether or not the vehicle travels straight when a difference between the current rotation angle and the maximum rotation angle exceeds a second offset reference.

The criterion for determining whether or not the vehicle travels straight may be derived by detecting the rotation angle of the steering wheel occurring when a curvature of the roadway is equal to or less than a preset reference curvature, a lane change frequency is equal to or less than a preset reference lane change frequency, a vehicle speed is equal to or greater than a preset reference speed, and a brake frequency is equal to or less than a preset reference brake frequency during a period of a preset driving distance or longer.

According to another aspect, there is provided a control method for producing an alarm when wheel misalignment of a vehicle occurs, the control method including: receiving, by a controller, from a navigation device, a lane change detector, a driving information detector, and a steering wheel rotation angle detector, information necessary to determine whether or not the vehicle travels straight; deriving, by the controller, a criterion based on a rotation angle of a steering wheel, for determining whether or not the vehicle travels straight by using the information necessary to determine whether or not the vehicle travels straight; and transmitting, by the controller, a alarm signal to a driver of the vehicle when a current rotation angle of the steering wheel detected by the steering wheel rotation angle detector fails to satisfy the criterion for determining whether or not the vehicle travels straight.

The information necessary to determine whether or not the vehicle travels straight may include curvature information of the roadway, lane change frequency information, vehicle speed information, brake frequency information, and the rotation angle of the steering wheel.

The criterion for determining whether or not the vehicle travels straight may be derived by detecting the rotation angle of the steering wheel occurring when a curvature of the roadway is equal to or less than a preset reference curvature, a lane change frequency is equal to or less than a preset reference lane change frequency, a vehicle speed is equal to or greater than a preset reference speed, and a brake frequency is equal to or less than a preset reference brake frequency during a preset reference time or longer.

The current rotation angle of the steering wheel may satisfy the criterion for determining whether or not the vehicle travels straight when the current rotation angle is equal to or greater than a minimum rotation angle of the steering wheel detected during the preset reference time, and is equal to or less than a maximum rotation angle of the steering wheel detected during the preset reference time.

The transmitting of the alarm signal may include transmitting, by the controller, the alarm signal to the driver when a difference between the current rotation angle and the minimum rotation angle exceeds a first offset reference.

The transmitting of the alarm signal may include transmitting, by the controller, the alarm signal to the driver when a difference between the current rotation angle and the maximum rotation angle exceeds a second offset reference.

A non-transitory computer readable medium containing program instructions executed by a processor can include: program instructions that receive from a navigation device, a lane change detector, a driving information detector, and a steering wheel rotation angle detector, information necessary to determine whether or not a vehicle travels straight; program instructions that derive a criterion based on a rotation angle of a steering wheel, for determining whether or not the vehicle travels straight by using the information necessary to determine whether or not the vehicle travels straight; and program instructions that transmit an alarm signal to a driver of the vehicle when a current rotation angle of the steering wheel detected by the steering wheel rotation angle detector fails to satisfy the criterion for determining whether or not the vehicle travels straight.

According to the system configured to produce the alarm when the wheel misalignment of the vehicle occurs and the control method for producing the same, the system has an advantage in terms of production costs because the wheel misalignment of the vehicle can be detected by using conventional hardware without requiring additional hardware. In addition, the system can warn the driver of the wheel misalignment, thereby preventing accidents caused by the vehicle leaning to one side and preventing uneven wear of the tires, etc.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, the exemplary embodiment of the present invention will be described in detail with reference to the accompanying drawings.

Figure 1:
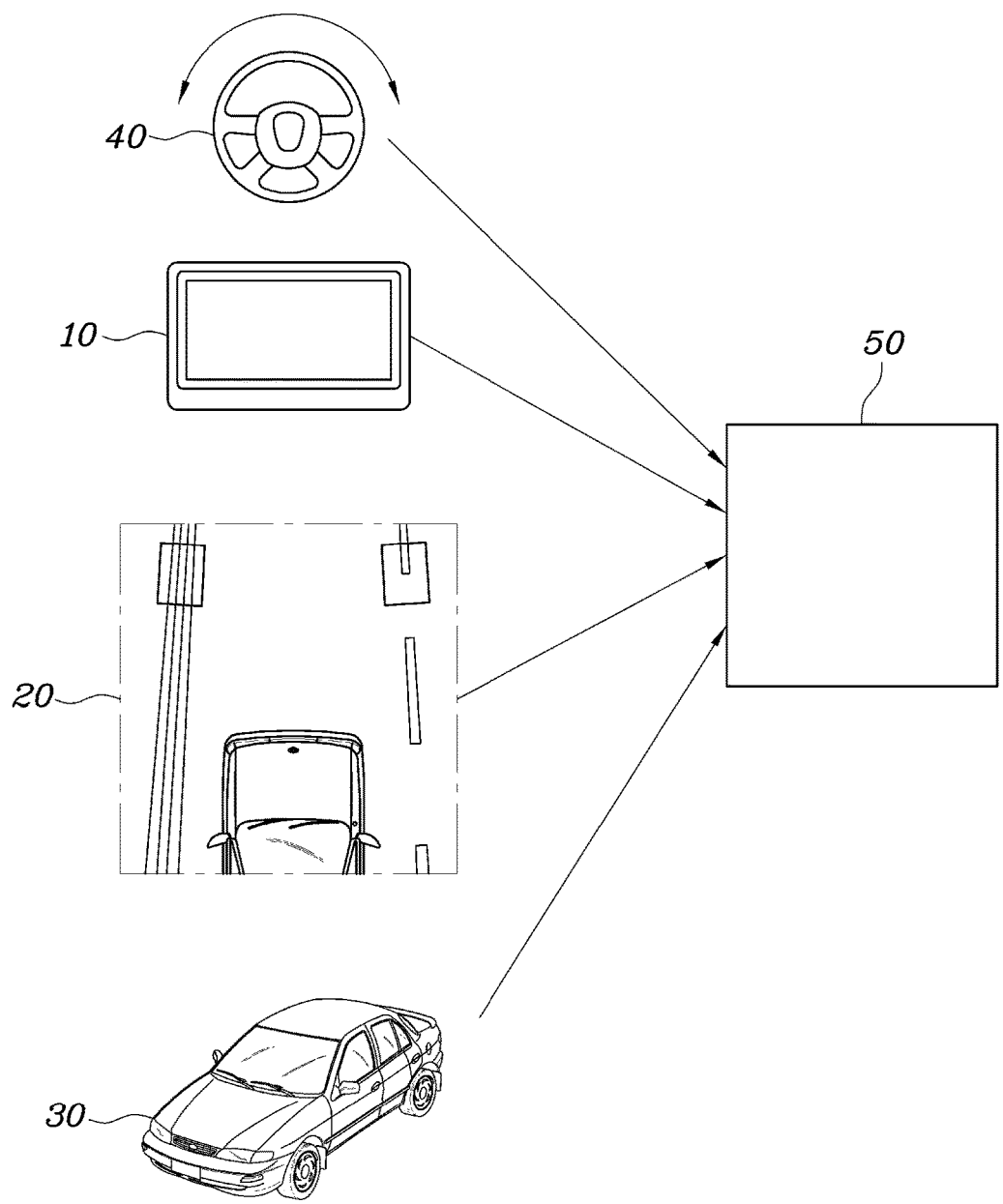
FIG. 1 is a schematic view showing the configuration of a system configured to produce an alarm when wheel misalignment of a vehicle occurs according to an exemplary embodiment of the present invention.

According to an exemplary embodiment of the present invention, as shown in FIG. 1, a system configured to produce an alarm when wheel misalignment of a vehicle occurs includes a navigation device 10; a lane change detector 20 configured to detect lane change frequency information of the vehicle; a driving information detector 30 configured to detect vehicle speed information and brake frequency information; a steering wheel rotation angle detector 40 configured to detect a rotation angle of a steering wheel; and a controller 50 deriving a criterion based on the rotation angle of the steering wheel, for determining whether or not the vehicle travels straight by receiving from the navigation device 10, the lane change detector 20, the driving information detector 30, and the steering wheel rotation angle detector 40, information necessary to determine whether or not the vehicle travels straight, the controller 50 transmitting an alarm signal to a driver of the vehicle when a current rotation angle of the steering wheel detected by the steering wheel rotation angle detector 40 fails to satisfy the criterion for determining whether or not the vehicle travels straight.

The navigation device 10 is a general navigation device 10 mounted in a vehicle or a portable device (e.g., a cell phone) used by a driver in the vehicle. The navigation device 10 stores roadway information including curvature information thereof. Recently, a lane change detector 20 may be frequently mounted in the vehicle. The lane change detector 20 detects whether or not the vehicle changes a lane. The driving information detector 30 may be provided at different positions depending on the type of vehicle. In addition, the driving information detector 30 may detect information about vehicle speed and brake frequency as well as information about acceleration and deceleration of a vehicle. The steering wheel rotation angle detector 40 detects the rotation angle of the steering wheel controlled by the driver. Therefore, a rotation angle of a vehicle wheel is derived from the rotation angle of the steering wheel that controls the vehicle wheel.

The controller 50 derives the criterion based on the rotation angle of the steering wheel, for determining whether or not the vehicle travels straight by using the information necessary to determine whether or not the vehicle travels straight detected by the navigation device 10, the lane change detector 20, the driving information detector 30, the steering wheel rotation angle detector 40. That is, the information necessary to determine whether or not the vehicle travels straight includes the curvature information of the roadway, the lane change frequency information, the vehicle speed information, the brake frequency information, and the rotation angle of the steering wheel.

The controller 50 derives the criterion for determining whether or not the vehicle travels straight by using the information necessary to determine whether or not the vehicle travels straight. The present invention provides two methods of deriving the criterion for determining whether or not the vehicle travels straight. The first method is that the criterion is derived by using a driving time of a vehicle, and the second method is that the criterion is derived by using a driving distance of a vehicle.

Firstly, with the first method of deriving the criterion by using a driving time of a vehicle, the criterion based on the rotation angle of the steering wheel, for determining whether or not the vehicle travels straight, is derived by detecting the rotation angle of the steering wheel occurring when a curvature of the roadway is equal to or less than a preset reference curvature, a lane change frequency is equal to or less than a preset reference lane change frequency, a vehicle speed is equal to or greater than a preset reference speed, and a brake frequency is equal to or less than a preset reference brake frequency during a preset reference time or longer.

There is much information necessary to determine whether or not a vehicle travels straight. Typical information is the curvature information of the roadway described above. Accordingly, whether or not the vehicle travels straight is determined by using the curvature information of the roadway. However, in spite of a straight roadway, the vehicle temporally moves from side to side when the driver of the vehicle changes a lane. Therefore, in this case, the vehicle does not travel straight. Accordingly, the present invention uses the lane change frequency as the information necessary to determine whether or not the vehicle travels straight.

In addition, the information necessary to determine whether or not the vehicle travels straight includes the vehicle speed information and the brake frequency information. When the vehicle speed is equal to or greater than a preset reference speed, the vehicle is traveling. When the brake frequency is equal to or less than a preset reference brake frequency, a reliable criterion for determining whether or not the vehicle travels straight can be derived. A reference curvature, a reference lane change frequency, a reference speed, and a reference brake frequency of the present invention are set to various values depending on the type of the vehicle and on designer needs.

The controller 50 compares a current rotation angle of the steering wheel with the criterion based on the rotation angle of the steering wheel, for determining whether or not the vehicle travels straight. Therefore, whether or not the wheels are misaligned is determined. The criterion for determining whether or not the vehicle travels straight is a rotation angle of the steering wheel when the vehicle travels straight. The current rotation angle of the steering wheel is compared with the criterion for determining whether or not the vehicle travels straight. When the current rotation angle fails to satisfy the criterion for determining whether or not the vehicle travels straight, the wheel misalignment of the vehicle is determined and an alarm signal is transmitted to the driver.

In contrast, when the current rotation angle of the steering wheel satisfies the criterion for determining whether or not the vehicle travels straight, the wheels of the vehicle are determined to be properly aligned. For example, the current rotation angle of the steering wheel satisfies the criterion for determining whether or not the vehicle travels straight when the current rotation angle is equal to or greater than a minimum rotation angle of the steering wheel detected during the preset reference time, and is equal to or less than a maximum rotation angle of the steering wheel detected during the preset reference time.

With only using the maximum rotation angle and the minimum rotation angle as reference values for determining whether or not the vehicle travels straight and detecting whether or not wheel misalignment has occurred, it is difficult to apply errors to the process of the detection. The errors (e.g., errors generally from noise) can be generated during the process of deriving the criterion for determining whether or not the vehicle travels straight and during the process of comparing the current rotation angle with the criterion for determining whether or not the vehicle travels straight.

Therefore, in consideration of the errors, the present invention applies additional reference values to the process of determining whether or not the current rotation satisfies the criterion. When a difference between the current rotation angle and the minimum rotation angle exceeds a first offset reference or when a difference between the current rotation angle and the maximum rotation angle exceeds a second offset reference, the controller determines that the current rotation angle of the steering wheel fails to satisfy the criterion for determining whether or not the vehicle travels straight.

Here, the first offset reference and the second offset reference are the additional reference values. The additional reference values can be various values depending on the designer demand. However, when the additional reference values are set as excessively large values, it is difficult to detect the wheel misalignment. Therefore, it is desirable that the additional reference values are set as proper values.

Secondly, there is the second method of deriving the criterion by using a driving distance rather than using a driving time of a vehicle. Similar to the first method, the criterion for determining whether or not the vehicle travels straight is derived by detecting the rotation angle of the steering wheel occurring when a curvature of the roadway is equal to or less than a preset reference curvature, a lane change frequency is equal to or less than a preset reference lane change frequency, a vehicle speed is equal to or greater than a preset reference speed, and a brake frequency is equal to or less than a preset reference brake frequency during a period of a preset driving distance or longer.

Figure 2:
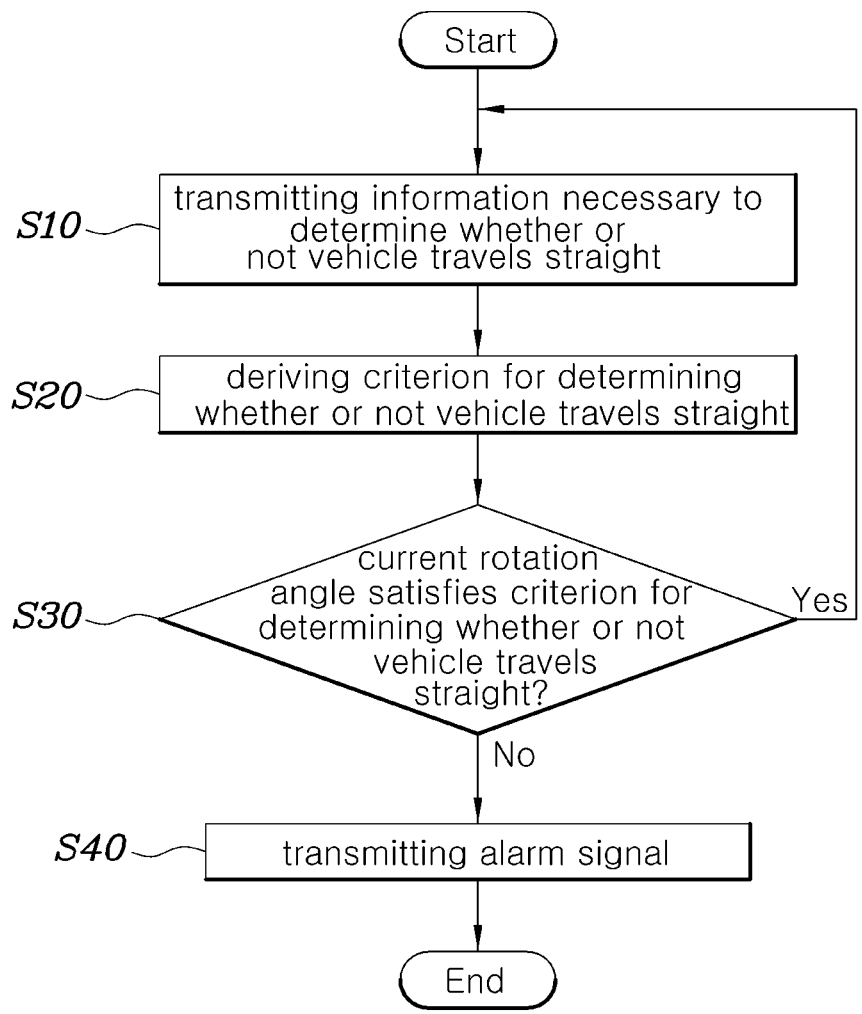
FIG. 2 is a flowchart showing a control method for producing an alarm when wheel misalignment of a vehicle occurs according to an exemplary embodiment of the present invention.

FIG. 2 is a flowchart showing a control method for producing an alarm when wheel misalignment of a vehicle occurs according to an exemplary embodiment of the present invention. The control method includes receiving, by the controller 50, from the navigation device 10, the lane change detector 20, the driving information detector 30, and the steering wheel rotation angle detector 40, information necessary to determine whether or not the vehicle travels straight at step S10; deriving, by the controller 50, a criterion based on a rotation angle of a steering wheel, for determining whether or not the vehicle travels straight by using the information necessary to determine whether or not the vehicle travels straight at step S20; when a current rotation angle of the steering wheel detected by the steering wheel rotation angle detector 40 fails to satisfy the criterion for determining whether or not the vehicle travels straight at step S30, transmitting, by the controller 50, an alarm signal to a driver of the vehicle at step S40.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A system configured to produce an alarm when wheel misalignment of a vehicle occurs when the vehicle is traveling on a roadway, the system comprising:
    a navigation device;
    a lane change device configured to detect lane change frequency information of the vehicle;
    a driving information device configured to detect vehicle speed information and brake frequency information;
    a steering wheel rotation angle device configured to detect a rotation angle of a steering wheel; and
    a controller configured to:
        derive a criterion based on the rotation angle of the steering wheel, for determining the wheel misalignment by receiving respective information from the navigation device, the lane change device, the driving information device, and the steering wheel rotation angle device; and
        trigger the alarm to a driver of the vehicle when the wheel misalignment occurs based on a current rotation angle of the steering wheel detected by the steering wheel rotation angle device fails to satisfy the criterion when the vehicle is traveling on the roadway,
    wherein the wheel misalignment occurs when preset angles of steering components of the vehicle are different from a design standard as a result of external forces during driving of the vehicle.

2. The system of claim 1, wherein the navigation device stores curvature information of the roadway.

3. The system of claim 2, wherein the information to determine the wheel misalignment includes the curvature information of the roadway, the lane change frequency information, the vehicle speed information, the brake frequency information, and the rotation angle of the steering wheel.

4. The system of claim 3, wherein the criterion for determining whether the wheel misalignment occurs is derived by detecting the current rotation angle of the steering wheel occurring when a curvature of the roadway is equal to or less than a preset reference curvature, a lane change frequency is equal to or less than a preset reference lane change frequency, a vehicle speed is equal to or greater than a preset reference speed, and a brake frequency is equal to or less than a preset reference brake frequency during a preset reference time or longer.

5. The system of claim 4, wherein the current rotation angle of the steering wheel satisfies the criterion for the wheel misalignment when the current rotation angle is equal to or greater than a minimum rotation angle of the steering wheel detected during the preset reference time, and is equal to or less than a maximum rotation angle of the steering wheel detected during the preset reference time.

6. The system of claim 5, wherein the controller determines that the current rotation angle of the steering wheel fails to satisfy the criterion for the wheel misalignment when a difference between the current rotation angle and the minimum rotation angle exceeds a first offset reference.

7. The system of claim 5, wherein the controller determines that the current rotation angle of the steering wheel fails to satisfy the criterion for the wheel misalignment when a difference between the current rotation angle and the maximum rotation angle exceeds a second offset reference.

8. The system of claim 3, wherein the criterion for the wheel misalignment is derived by detecting the rotation angle of the steering wheel occurring when a curvature of the roadway is equal to or less than a preset reference curvature, a lane change frequency is equal to or less than a preset reference lane change frequency, a vehicle speed is equal to or greater than a preset reference speed, and a brake frequency is equal to or less than a preset reference brake frequency during a period of a preset driving distance or longer.

9. A control method for producing an alarm when wheel misalignment of a vehicle occurs when the vehicle is traveling on a roadway, the control method comprising:
receiving, by a controller, from a navigation device, a lane change device, a driving information device, and a steering wheel rotation angle device, information for determining whether the wheel misalignment occurs;
deriving, by the controller, a criterion based on a rotation angle of a steering wheel for determining the wheel misalignment by using the information for determining whether the wheel misalignment occurs; and
triggering, by the controller, the alarm to a driver of the vehicle when the wheel misalignment occurs based on a current rotation angle of the steering wheel detected by the steering wheel rotation angle device fails to satisfy the criterion when the vehicle is traveling on the roadway,
wherein the wheel misalignment occurs when preset angles of steering components of the vehicle are different from a design standard as a result of external forces during driving of the vehicle.

10. The control method of claim 9, wherein the information to determine the wheel misalignment includes curvature information of the roadway, lane change frequency information, vehicle speed information, brake frequency information, and the rotation angle of the steering wheel.

11. The control method of claim 10, wherein the criterion for determining whether the wheel misalignment occurs is derived by detecting the current rotation angle of the steering wheel occurring when a curvature of the roadway is equal to or less than a preset reference curvature, a lane change frequency is equal to or less than a preset reference lane change frequency, a vehicle speed is equal to or greater than a preset reference speed, and a brake frequency is equal to or less than a preset reference brake frequency during a preset reference time or longer.

12. The control method of claim 11, wherein the current rotation angle of the steering wheel satisfies the criterion for the wheel misalignment when the current rotation angle is equal to or greater than a minimum rotation angle of the steering wheel detected during the preset reference time, and is equal to or less than a maximum rotation angle of the steering wheel detected during the preset reference time.

13. The control method of claim 12, wherein the triggering of the alarm comprises:
triggering, by the controller, the alarm to the driver when a difference between the current rotation angle and the minimum rotation angle exceeds a first offset reference.

14. The control method of claim 12, wherein the triggering of the alarm comprises:
triggering, by the controller, the alarm to the driver when a difference between the current rotation angle and the maximum rotation angle exceeds a second offset reference.

15. A non-transitory computer readable medium containing program instructions executed by a processor, to perform a method or producing an alarm when wheel misalignment of a vehicle occurs when the vehicle is traveling on a roadway, the method comprising:
receiving from a navigation device, a lane change device, a driving information device, and a steering wheel rotation angle device, information for determining whether the wheel misalignment occurs;
deriving a criterion based on a rotation angle of a steering wheel, for determining the wheel misalignment by using the information for determining whether the wheel misalignment occurs; and
triggering the alarm to a driver of the vehicle when the wheel misalignment occurs based on a current rotation angle of the steering wheel detected by the steering wheel rotation angle device fails to satisfy the criterion when the vehicle is traveling on the roadway,
wherein the wheel misalignment occurs when preset angles of steering components of the vehicle are different from a design standard as a result of external forces during driving of the vehicle.

* * * * *